United States Patent
Kim et al.

(10) Patent No.: US 10,587,182 B2
(45) Date of Patent: Mar. 10, 2020

(54) POWER CONVERSION DEVICE HAVING A CONTROL UNIT THAT OUTPUTS BASED ON DETECTED INDUCTOR CURRENT

(71) Applicant: LG ELECTRONICS INC., Seoul (KR)

(72) Inventors: Kyeongtae Kim, Seoul (KR); Yonghwa Lee, Seoul (KR); Jeongeon Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/739,925

(22) PCT Filed: Jun. 24, 2016

(86) PCT No.: PCT/KR2016/006738
§ 371 (c)(1),
(2) Date: Dec. 26, 2017

(87) PCT Pub. No.: WO2016/209017
PCT Pub. Date: Dec. 29, 2016

(65) Prior Publication Data
US 2018/0367024 A1    Dec. 20, 2018

(30) Foreign Application Priority Data
Jun. 26, 2015 (KR) .................. 10-2015-0091421

(51) Int. Cl.
*H02M 1/12* (2006.01)
*H02M 1/14* (2006.01)
(Continued)

(52) U.S. Cl.
CPC .............. *H02M 1/12* (2013.01); *F24F 11/88* (2018.01); *F24F 11/89* (2018.01); *H02M 1/143* (2013.01);
(Continued)

(58) Field of Classification Search
CPC ................ H02M 1/12; H02M 1/143; H02M 2001/0009; H02M 3/07;
(Continued)

(56) References Cited

U.S. PATENT DOCUMENTS

2002/0153960 A1* 10/2002 Ichimaru ............... H03L 7/0896
331/17
2008/0205096 A1* 8/2008 Lai ........................... H02J 3/38
363/40

(Continued)

OTHER PUBLICATIONS

Cha et al., "Design and Control of Proportional-Resonant Controller Based Photovoltaic Power Conditioning System", 2009, IEEE, pp. 2198-2205 (Year: 2009).*

*Primary Examiner* — Nguyen Tran
*Assistant Examiner* — David A. Singh
(74) *Attorney, Agent, or Firm* — KED & Associates LLP

(57) ABSTRACT

The power conversion device may include a rectification unit, a boost converter for boosting power rectified from the rectification unit, a dc-end capacitor connected to an output end of the boost converter, an inductor current detection unit for detecting an inductor current flowing in an inductor within the boost converter, a dc-end voltage detection unit for detecting voltages of both ends of the dc-end capacitor, and a control unit for controlling the boost converter. The control unit may generate and output a converter switching control signal by performing proportional resonant control for a duty command value of a switching element within the boost converter, based on the detected inductor current and dc-end voltage. Therefore, a harmonic current component flowing through a dc-end capacitor induced by a ripple component of an input voltage may be reduced.

12 Claims, 12 Drawing Sheets

(51) Int. Cl.

| | |
|---|---|
| *H02M 3/156* | (2006.01) |
| *H02M 7/48* | (2007.01) |
| *H02M 1/15* | (2006.01) |
| *H02M 1/42* | (2007.01) |
| *F24F 11/88* | (2018.01) |
| *H02M 7/5395* | (2006.01) |
| *F24F 11/89* | (2018.01) |
| *H02M 3/07* | (2006.01) |
| *H02M 5/451* | (2006.01) |
| *H02M 3/158* | (2006.01) |
| *H02M 5/458* | (2006.01) |
| *H02M 1/00* | (2006.01) |
| *H01F 30/12* | (2006.01) |

(52) U.S. Cl.
CPC ........... *H02M 1/15* (2013.01); *H02M 1/4225* (2013.01); *H02M 3/07* (2013.01); *H02M 5/451* (2013.01); *H02M 7/48* (2013.01); *H02M 7/5395* (2013.01); *H01F 30/12* (2013.01); *H02M 5/458* (2013.01); *H02M 2001/007* (2013.01); *H02M 2001/0009* (2013.01); *H02M 2003/1566* (2013.01); *H02M 2003/1586* (2013.01)

(58) Field of Classification Search
CPC .. H02M 2003/1566; H02M 5/40; H02M 5/42; H02M 5/44; H02M 5/45; H02M 5/451

USPC .................................. 363/13, 39–41, 44–48
See application file for complete search history.

(56) References Cited

U.S. PATENT DOCUMENTS

| | | | | |
|---|---|---|---|---|
| 2009/0113908 | A1* | 5/2009 | Hwang | F25B 49/025 62/228.1 |
| 2010/0226149 | A1* | 9/2010 | Masumoto | H02M 1/4225 363/20 |
| 2011/0132899 | A1* | 6/2011 | Shimomugi | H02M 3/1584 219/620 |
| 2013/0271077 | A1* | 10/2013 | Kim | B60L 11/1811 320/109 |
| 2013/0342139 | A1* | 12/2013 | Shimomugi | H02M 7/066 318/400.3 |
| 2014/0211521 | A1* | 7/2014 | Mazumder | H02M 7/48 363/40 |
| 2014/0271272 | A1* | 9/2014 | Jeon | H02M 7/06 417/410.1 |
| 2015/0171734 | A1* | 6/2015 | Yu | H02M 1/12 363/45 |
| 2015/0171775 | A1* | 6/2015 | Cho | F25B 49/025 62/228.1 |
| 2015/0180384 | A1* | 6/2015 | An | F25B 1/005 62/498 |
| 2015/0354870 | A1* | 12/2015 | Lee | F24F 11/30 62/498 |
| 2016/0268917 | A1* | 9/2016 | Ramsay | H02M 5/458 |

* cited by examiner

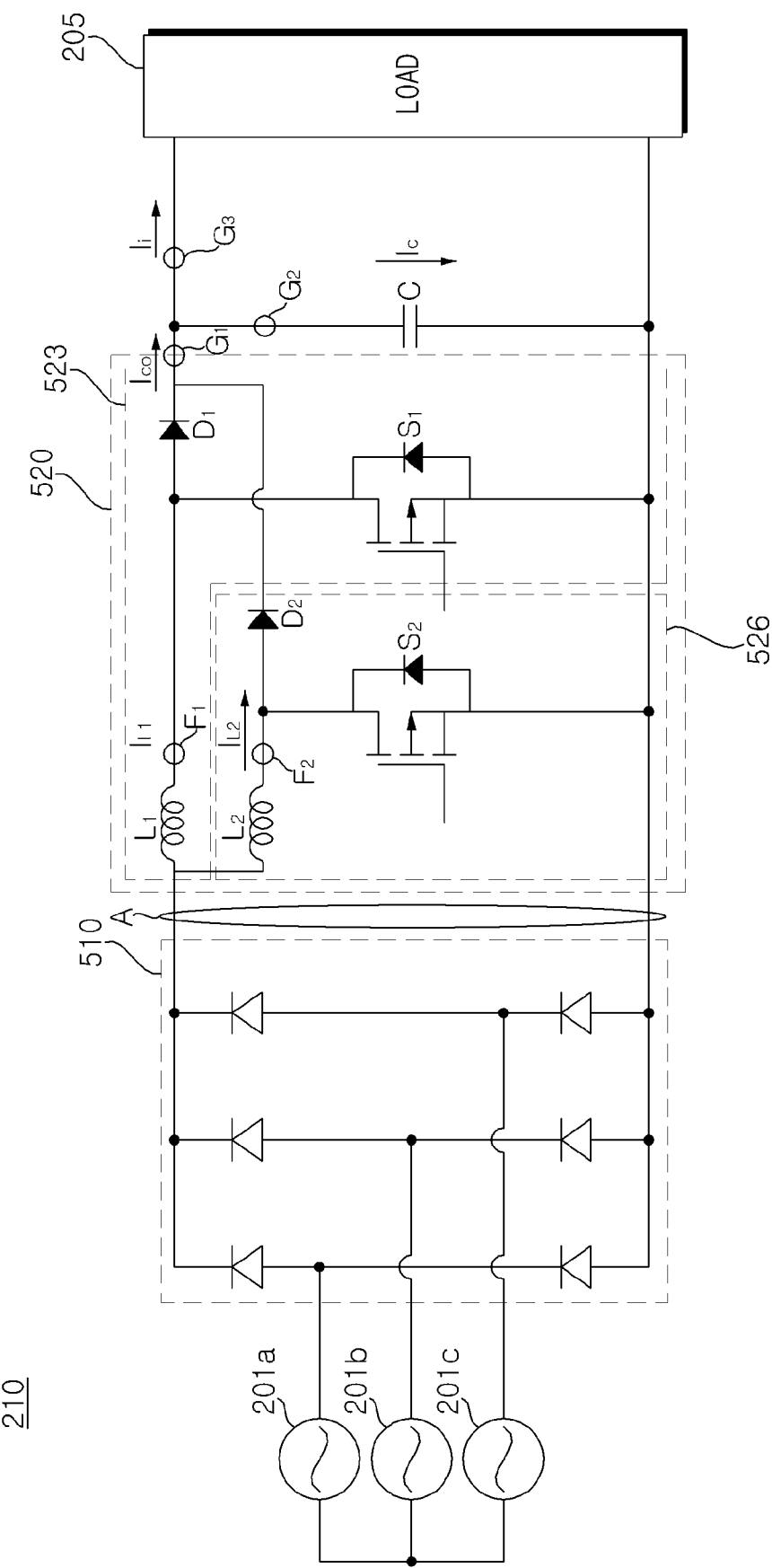

POWER CONVERSION DEVICE HAVING A CONTROL UNIT THAT OUTPUTS BASED ON DETECTED INDUCTOR CURRENT

CROSS-REFERENCE TO RELATED PATENT APPLICATIONS

This application is a U.S. National Stage Application under 35 U.S.C. § 371 of PCT Application No. PCT/KR2016/006738, filed Jun. 24, 2016, which claims priority to Korean Patent Application No. 10-2015-0091421, filed Jun. 26, 2015, whose entire disclosures are hereby incorporated by reference.

TECHNICAL FIELD

The present invention relates to a power conversion device and an air conditioner comprising the same, and more particularly to, a power conversion device that can reduce a harmonic current component flowing through a dc-end capacitor induced by a ripple component of an input voltage.

BACKGROUND ART

A power conversion device is included in electronic appliances for operating them. For example, the power conversion device converts alternating current power to direct current power or converts the level of direct current power.

Meanwhile, an air conditioner, which is an electronic appliance, is installed to provide a more comfortable interior environment for humans by directing cold or warm air into a room to adjust the room temperature and purify the indoor air. Typically, the air conditioner includes an indoor unit composed of a heat exchanger and installed indoors, and an outdoor unit composed of a compressor, a heat exchanger, etc. and supplying refrigerant to the indoor unit.

The air conditioner operates with input alternating current voltage—in particular, a motor is driven by an inverter. In this case, the operation may become temporarily unstable depending on how the load connected to the inverter varies.

DISCLOSURE

Technical Problem

An aspect of the present invention is to provide a power conversion device that can reduce a harmonic current component flowing through a dc-end capacitor induced by a ripple component of an input voltage, and an air conditioner comprising the same.

Technical Solution

According to an exemplary embodiment of the present invention to achieve the above aspect, there is provided a power conversion device including: a rectification unit for rectifying input alternating current power; a boost converter for boosting power rectified from the rectification unit and outputting the same; a dc-end capacitor connected to an output end of the boost converter; an inductor current detection unit for detecting an inductor current flowing in an inductor within the boost converter; a dc-end voltage detection unit for detecting voltages of both ends of the dc-end capacitor; and a control unit for controlling the boost converter, wherein the control unit generates and outputs a converter switching control signal by performing proportional resonant control for a duty command value of a switching element within the boost converter, on the basis of the detected inductor current and dc-end voltage.

According to another exemplary embodiment of the present invention to achieve the above aspect, there is provided a power conversion device including: a rectification unit for rectifying input alternating current power; a boost converter for boosting power rectified from the rectification unit and outputting the same; a dc-end capacitor connected to an output end of the boost converter; an inductor current detection unit for detecting an inductor current flowing in an inductor within the boost converter; a dc-end voltage detection unit for detecting voltages of both ends of the dc-end capacitor; and a control unit for controlling the boost converter, wherein the control unit generates and outputs a converter switching control signal which reduces a harmonic current component flowing through the dc-end capacitor induced by a ripple component of an input voltage, on the basis of the detected inductor current and dc-end voltage.

According to still another exemplary embodiment of the present invention to achieve the above object, there is provided an air conditioner including: a compressor that compresses a refrigerant; a heat exchanger that transfers heat using the compressed refrigerant; and a power conversion device for driving the compressor, the power conversion device including: a rectification unit for rectifying input alternating current power; a boost converter for boosting power rectified from the rectification unit and outputting the same; a dc-end capacitor connected to an output end of the boost converter; an inductor current detection unit for detecting an inductor current flowing in an inductor within the boost converter; a dc-end voltage detection unit for detecting voltages of both ends of the dc-end capacitor; and a control unit for controlling the boost converter, wherein the control unit generates and outputs a converter switching control signal by performing proportional resonant control for a duty command value of a switching element within the boost converter, on the basis of the detected inductor current and dc-end voltage.

Advantageous Effects

A power conversion device and an air conditioner comprising the same according to an exemplary embodiment of the present invention can reduce a harmonic current component flowing through a dc-end capacitor induced by a ripple component of an input voltage, since the power conversion device includes: a rectification unit for rectifying input alternating current power; a boost converter for boosting power rectified from the rectification unit and outputting the same; a dc-end capacitor connected to an output end of the boost converter; an inductor current detection unit for detecting an inductor current flowing in an inductor within the boost converter; a dc-end voltage detection unit for detecting voltages of both ends of the dc-end capacitor; and a control unit for controlling the boost converter, wherein the control unit generates and outputs a converter switching control signal by performing proportional resonant control for a duty command value of a switching element within the boost converter, on the basis of the detected inductor current and dc-end voltage.

In particular, if the input alternating current power is three-phase input alternating current power, a ripple in a sixth component of an input voltage may occur to the current flowing through the dc-end capacitor, due to an ac ripple component of the input voltage. However, through proportional resonant control of the control unit, a duty command value of a switching element within the boost converter can be compensated by using a gain for a harmonic component of the input voltage, thereby reducing a harmonic current ripple component of the sixth component.

Meanwhile, in case of an unbalanced system of input alternating current power, the control unit may further perform phase-locked loop control, and therefore a harmonic current component flowing through the dc-end capacitor can be reduced while resolving the unbalanced system.

Meanwhile, a capacitor with a low capacitance can be used since a ripple current flowing into the capacitor is stably reduced. Accordingly, the manufacturing costs can be reduced.

DESCRIPTION OF DRAWINGS

FIG. 5B is another exemplary circuit diagram of the converter of FIG. 3.

MODE FOR INVENTION

Hereinafter, the present invention will be described in more detail with reference to the drawings.

The suffixes "module" and "unit" for components used in the description below are assigned or mixed in consideration of easiness in writing the specification and, do not have distinctive meanings or roles by themselves. Thus, the suffixes "module" and "unit" may be used interchangeably.

Figure 1:
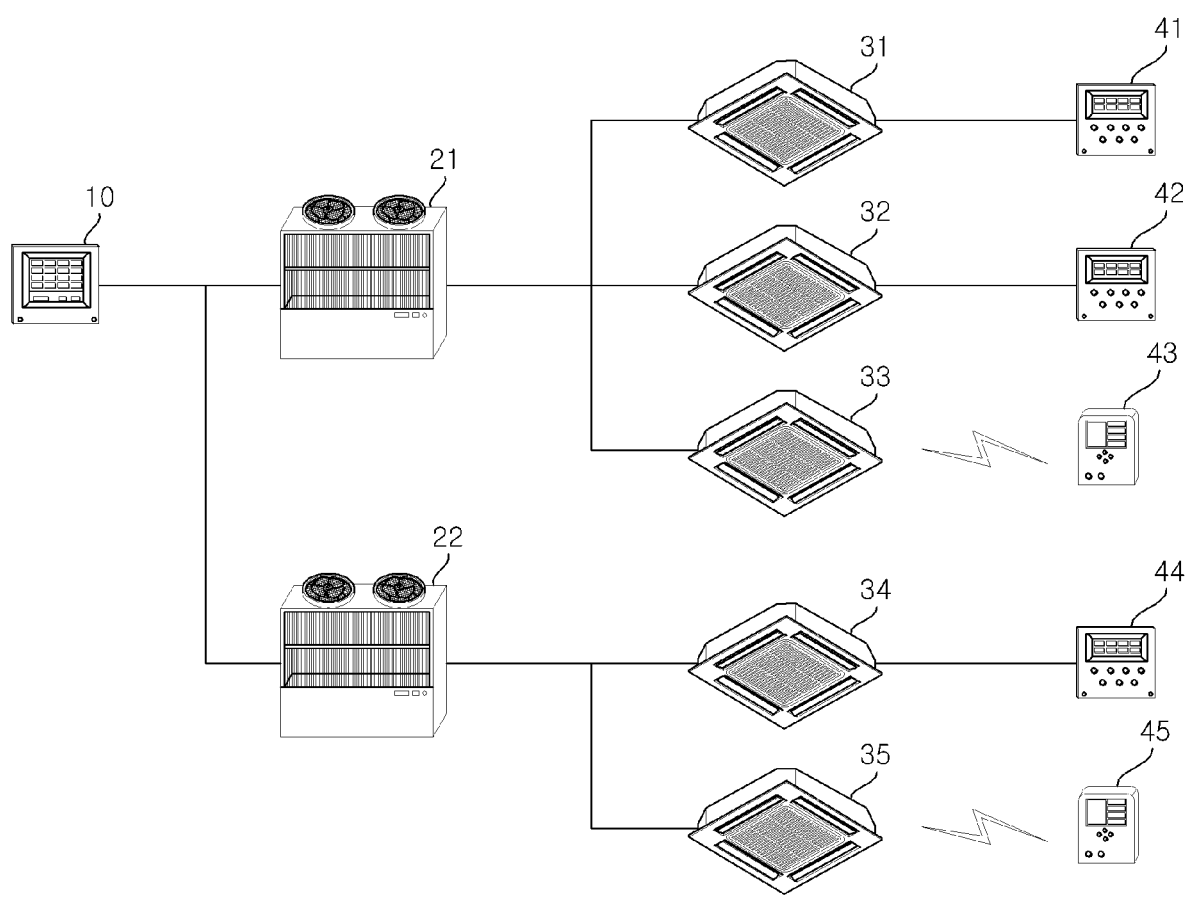
FIG. 1 is a diagram illustrating a configuration of an air conditioner according to an exemplary embodiment of the present invention.

FIG. 1 is a diagram illustrating a configuration of an air conditioner according to an exemplary embodiment of the present invention.

As shown in FIG. 1, an air conditioner according to an exemplary embodiment of the present invention is a large air conditioner 50, and may include a plurality of indoor units 31 to 35, a plurality of outdoor units 21 and 22 connected to the plurality of indoor units, remote controls 61 to 45 respectively connected to the plurality of indoor units, and a remote controller 10 controlling the plurality of indoor units and outdoor units.

The remote controller 10 is connected to the plurality of indoor units 31 to 36 and the plurality of outdoor units 21 and 22 and monitors and controls their operations. In this case, the remote controller 10 may be connected to the plurality of indoor units and perform operation setup, lock settings, schedule control, group control, etc. on the indoor units.

Although the air conditioner may be any one of the following: a standing air conditioner, a wall-mounted air conditioner, and a ceiling-mounted air conditioner, the ceiling-mounted air conditioner will be given below as an example for convenience of explanation. Also, the air conditioner may further include at least one among a ventilator, an air cleaner, a humidifier, and a heater, and may operate in tandem with the operations of the indoor units and outdoor units.

The outdoor units 21 and 22 include a compressor (not shown) that is supplied with a refrigerant and compresses it, an outdoor heat exchanger (not shown) that transfers heat between the refrigerant and the outside air, an accumulator (not shown) that extracts a gaseous refrigerant from the supplied refrigerant, and a four-way valve (not shown) that selects a refrigerant flow path for heating operation. Also, the outdoor units 21 and 22 further includes a plurality of sensors, valves, an oil recovery unit, etc., but descriptions of these components will be omitted below.

The outdoor units 21 and 22 runs the compressor and outdoor heat exchanger included in them to compress the refrigerant or transfer heat depending on the settings and supply the refrigerant to the indoor units 31 to 35. The outdoor units 21 and 22 are run by a request from the remote controller 10 or indoor units 31 to 35, and the number of running outdoor units and the number of running compressors installed in the outdoor units vary as the cooling/heating capacity varies in response to the indoor units being run.

Although the description here will be given on the assumption that a plurality of outdoor units 22 and 22 supply refrigerant to each of individually connected indoor units, a plurality of outdoor units may be mutually connected and supply refrigerant to a plurality of indoor units depending on the connection structure of the outdoor units and indoor units.

The indoor units 31 to 35 may be connected to one of the plurality of outdoor units 21 and 22 and supplied with a refrigerant and release warm air into the room. The indoor units 31 to 35 include an indoor heat exchanger (not shown), an indoor unit fan (not shown), an expansion valve (not shown) for expanding the supplied refrigerant, and a plurality of sensors (not shown).

In this case, the outdoor units 21 and 22 and the indoor units 31 to 35 are connected by communication lines and send and receive data to each other, and the outdoor units and the indoor units are connected to the remote controller 10 by a separate communication line and operate under control of the remote controller 10.

The remote controls 61 to 45 are connected to the indoor units, respectively, and may send a user control command to the indoor units and receive and show the indoor units' status information. In this case, the remote controls communicate in a wireless or wired manner depending on how they are connected to the indoor units, and in some cases, one remote control may be connected to multiple indoor units and the multiple indoor units' settings may be changed via input from the one remote control.

Moreover, the remote controls 61 to 45 may internally include a temperature detecting sensor.

Figure 2:
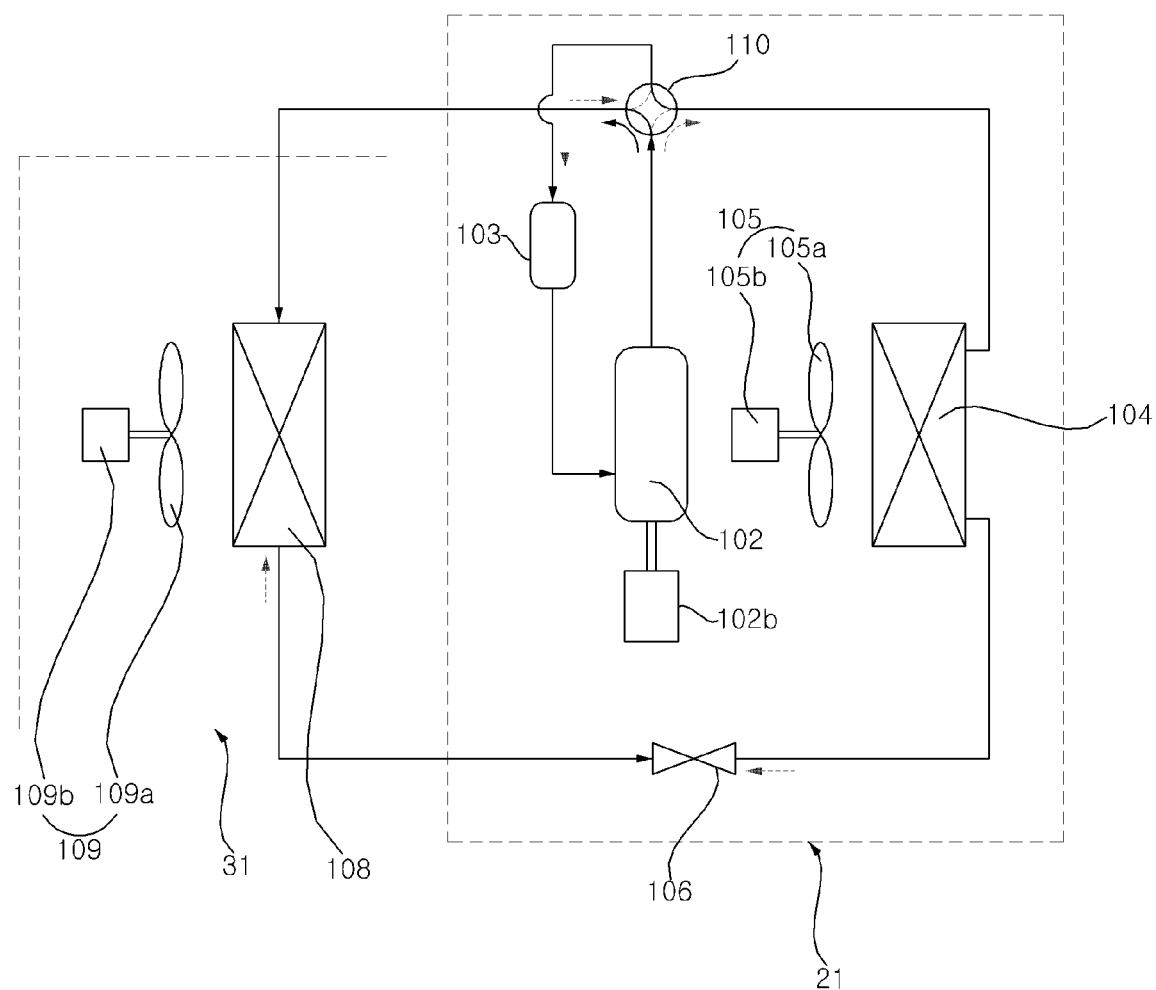
FIG. 2 is a schematic diagram of an outdoor unit and indoor unit of FIG.

FIG. 2 is a schematic diagram of an outdoor unit and indoor unit of FIG. 1.

Referring to the drawing, the air conditioner 50 is largely divided into an indoor unit 31 and an outdoor unit 21.

The outdoor unit 21 includes a compressor 102 serving to compress a refrigerant, a compressor motor 102b running the compressor, an outdoor heat exchanger 104 serving to release the compressed refrigerant, an outdoor blower 105a disposed at one side of the outdoor heat exchanger 104 and consisting of an outdoor fan and facilitating the release of refrigerant and a motor 105b rotating the outdoor fan 105a, a cooling/heating switching valve 110 changing the flow path of the compressed refrigerant, and an accumulator 103 temporarily storing a gaseous refrigerant and removing moisture and impurities from it and then supplying a refrigerant under a certain pressure to the compressor.

The indoor unit 31 includes an indoor heat exchanger 109 disposed indoors and performing cooling/heating functions, and an indoor blower 109a disposed at one side of the indoor heat exchanger 109 and consisting of an indoor fan 109a facilitating the release of refrigerant and a motor 109b rotating the indoor fan 109a.

At least one indoor heat exchanger 109 may be installed. At least one between an inverter compressor and a constant-speed compressor may be used as the compressor 102.

Moreover, the air conditioner 50 may be configured as a cooling machine for cooling a room or as a heat pump for cooling or heating a room.

Meanwhile, although FIG. 2 depicts one indoor unit 31 and one outdoor unit 21, an apparatus for operating an air conditioner according to an exemplary embodiment of the present invention is not limited to this, a multi-type air conditioner with a plurality of indoor units and outdoor units and an air conditioner with a single indoor unit and a plurality of outdoor units may be applicable.

Figure 3:
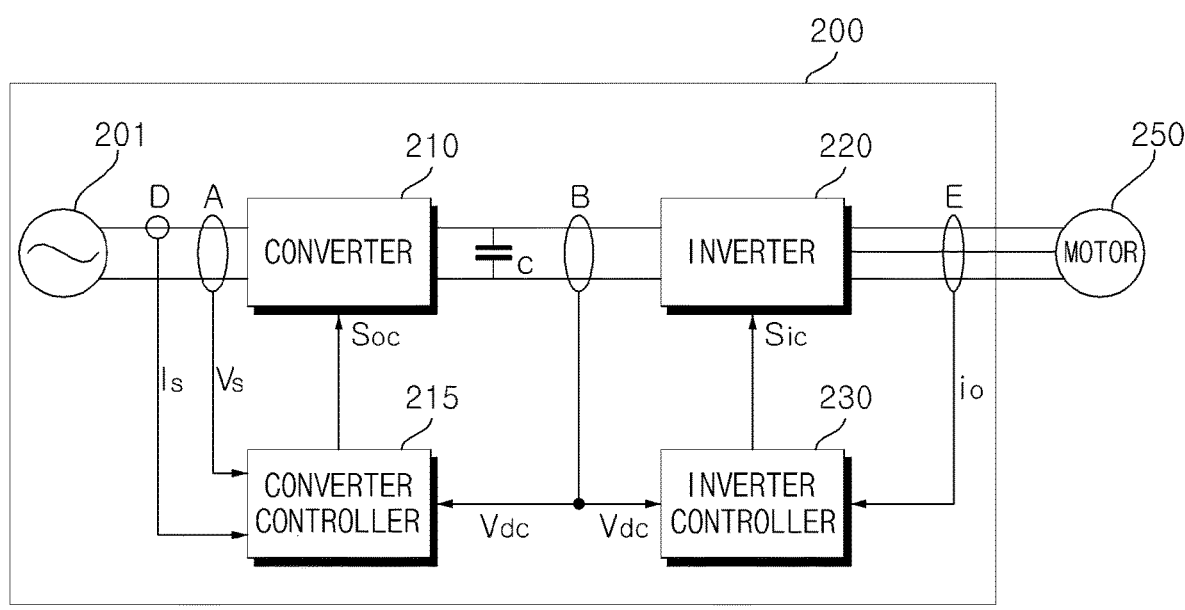
FIG. 3 is a block diagram of a power conversion device within an outdoor unit of FIG. 1.

FIG. 3 is a block diagram of a power conversion device within an outdoor unit of FIG. 1.

Referring to the drawing, the power conversion device 200 is a power conversion device for running a compressor, and may run a compressor motor 250. Meanwhile, the compressor 102 may be run by running the compressor motor 250.

To this end, the power conversion device 200 may include an inverter 220 outputting a three-phase alternating current to the compressor motor 250, an inverter control unit 230 controlling the inverter 220, a converter 210 supplying direct current power to the inverter 220, and a converter control unit 215 controlling the converter 210.

Meanwhile, the power conversion device 200 is supplied with alternating current power from a system, converts power, and supplies the converted power to the compressor motor 250. Thus, the power conversion device 200 may be considered as a compressor driver. Hereinafter, the terms "compressor driver" and "power conversion device" may be used interchangeably.

Meanwhile, according to the present invention, in the power conversion device 200, the converter 210 supplying direct current power to the inverter 220 receives three-phase alternating current and converts it into direct current power. To this end, the converter 210 may have a rectification unit (510 of FIGS. 5A and 5B) and a boost converter (515 of FIG. 5A) or interleaved boost converter (520 of FIG. 5B). Besides, a reactor (not shown) may be further provided.

A dc-end capacitor C is connected to a dc end which is the output of the converter 210. The dc-end capacitor C may store power output from the converter 210.

The converter control unit 215 may control the converter 210 which has a switching element. The converter control unit 215 may output a converter switching control signal Scc for controlling the boost converter (515 of FIG. 5A) or interleaved boost converter (520 of FIG. 5B).

To this end, the power conversion device 200 may have an input current detection unit D detecting an input current Is from an input alternating current power source 201, and an input voltage detection unit A detecting an input voltage Vs.

The converter control unit 215 may generate and output a converter switching control signal Scc for controlling the boost converter (515 of FIG. 5A) or interleaved boost converter (520 of FIG. 5B), on the basis of the detected input current, input voltage, and dc-end voltage, and an inductor current IL flowing in an inductor L within the converter.

The inverter 220 has a plurality of inverter switching elements, and may convert direct current power Vdc smoothened by the on/off operation of the switching elements into three-phase alternating current power of a predetermined frequency and output it to the three-phase motor 250.

Specifically, the inverter 220 may have a plurality of switching elements. For example, upper arm switching elements Sa, Sb, and Sc and lower arm switching element S'a, S'b, and S'c are connected in series and form pairs, respectively—that is, a total of three pairs of upper and lower arm switching elements Sa & S'a, Sb & S'b, and Sc & S'c may be connected in parallel to one another. Also, the switching element Sa, S'a, Sb, S'b, Sc, and S'c may have diodes connected in inverse parallel.

The inverter control unit 230 may output an inverter switching control signal Sic to the inverter 220, in order to control the switching operation of the inverter 220. The inverter switching control signal Sic is a pulse width modulated (PWM) switching control signal, and may be generate and output based on an output current io flowing through the motor 250 or a dc-end voltage Vdc at both ends of the dc-end capacitor. The output current io may be detected by an output current detection unit E, and the dc-end voltage Vdc may be detected by a dc-end voltage detection unit B.

The dc-end voltage detection unit B may detect the voltage Vdc stored in the dc-end capacitor C. To this end, the dc-end voltage detection unit B may have a VT (voltage transformer) or a resistive element. The detected dc-end voltage Vdc is input into the inverter control unit 230.

The output current detection unit E may detect the output current io flowing between the inverter 620 and the motor 250. That is, the current flowing through the motor 250 is detected. The output current detection unit E may detect output currents ia, ib, and is of all phases, or may detect output currents of two phases by using three-phase balance.

The output current detection unit E may be positioned between the inverter 220 and the motor 250, and may use a CT (current transformer), a shunt resistor, etc. for current detection.

Meanwhile, with regard to an exemplary embodiment of the present invention, the converter control unit 215 may generate and output a converter switching control signal Scc by performing proportional resonant (PE) control for a duty command value of a switching element within the boost converter 210, on the basis of the detected inductor current IL, dc-end voltage Vdc, and input voltage Vs. Accordingly, it possible to reduce a harmonic current component flowing Othrough the dc-end capacitor C induced by a ripple component of an input voltage.

In particular, if the input alternating current power is three-phase input alternating current power, a ripple in a sixth component of an input voltage may occur to the current flowing through the dc-end capacitor C, due to an ac ripple component of the input voltage. However, through proportional resonance control of the converter control unit 215, a duty command value of a switching element within the boost converter can be compensated by using a gain for a harmonic component of the input voltage, thereby reducing a harmonic current ripple component of the sixth component.

Meanwhile, through proportional resonant control, the converter control unit 215 may compensate a duty command value of a switching element within the boost converter by using a gain for a harmonic component of the input voltage.

Meanwhile, the converter control unit 215 may generate and output a converter switching control signal Scc by performing proportional resonant control and phase-locked loop control for a duty command value of a switching element within the boost converter 210, on the basis of the detected inductor current IL, dc-end voltage Vdc, and input voltage Vs.

Meanwhile, in case of an unbalanced system of input alternating current power, the converter control unit 215 may further perform phase-locked loop control, and therefore a harmonic current component flowing through the dc-end capacitor C can be reduced while resolving the unbalanced system.

Meanwhile, the converter control unit 215 may generate and output a converter switching control signal Scc for compensating for the current ripple flowing through the dc-end capacitor that corresponds to a ripple component of the input voltage Vs, on the basis of the detected inductor current IL, dc-end voltage Vdc, and input voltage Vs.

Figure 4:
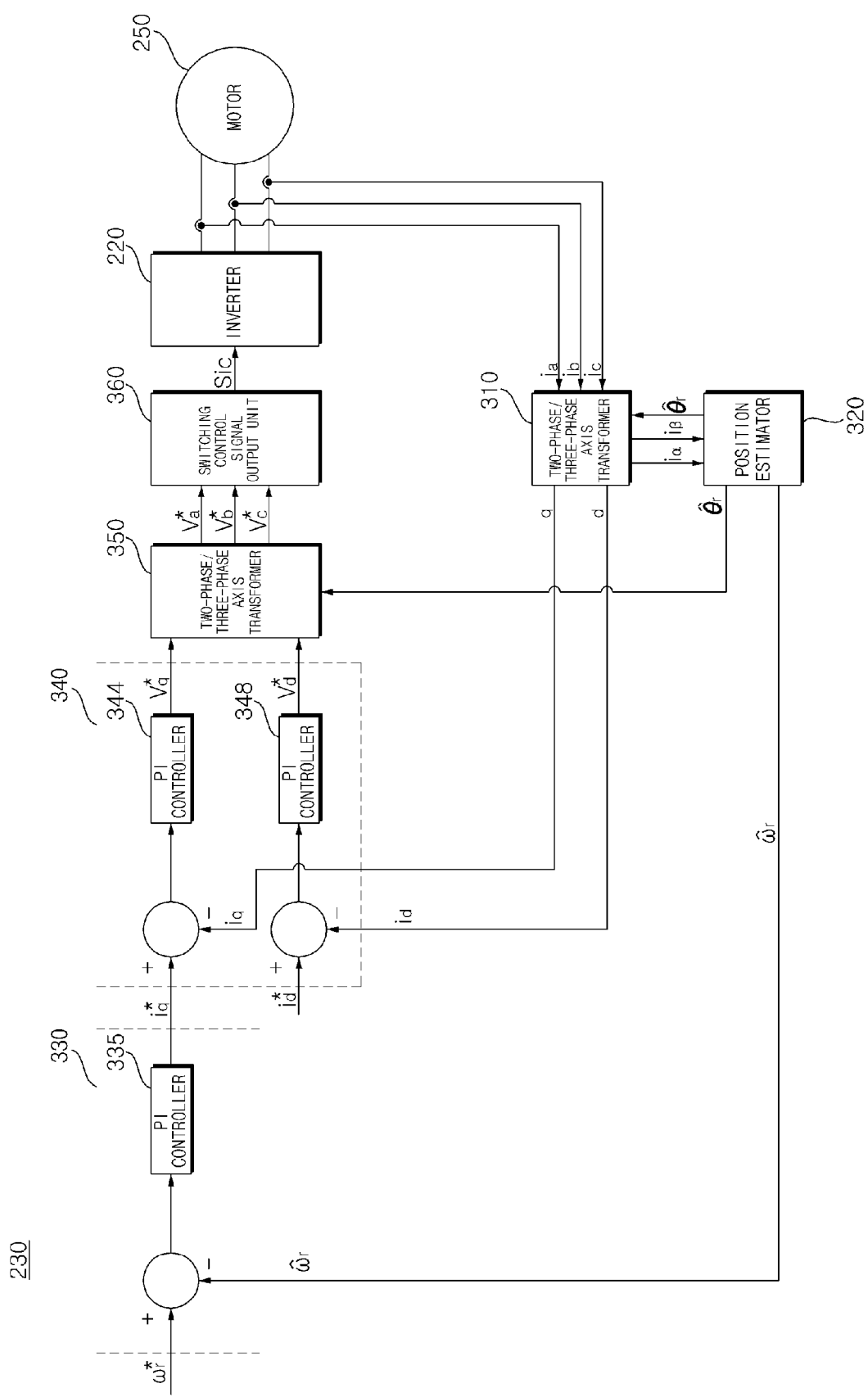
FIG. 4 is an internal block diagram of the inverter control unit of FIG. 3.

FIG. 4 is an internal block diagram of the inverter control unit of FIG. 3.

Referring to FIG. 4, the inverter control unit 230 may include an axis transformer 310, a position estimator 320, a current command generator 330, a voltage command generator 340, an axis transformer 350, and a switching control signal output part 360.

The axis transformer 310 may receive three-phase output currents ia, ib, and ic detected by the output current detection unit E and transform them into two-phase currents iα and iβ of a stationary coordinate system.

Meanwhile, the axial transformer 310 may transform the two-phase current iα and iβ of the stationary coordinate system into two-phase currents id and iq of a rotating coordinate system.

The position estimator 320 estimates the rotor position $\hat{\theta}_r$ of the motor 250 based on the two-phase current iα and iβ of the stationary coordinate system, obtained by the transformation by the axis transformer 320. Also, a calculated speed $\hat{\omega}_r$ may be output based on the estimated rotor position $\hat{\theta}_r$.

Meanwhile, the current command generator 330 calculates a speed command value ω*q based on the calculated speed $\hat{\omega}_r$ and a target speed ω, generates a current command value i*q based on the speed command value ω*q. For example, the current command generator 330 may perform PI control by a PI controller 635 and generate the current command value i*q, based on the speed command value ω*q which is the difference between the calculated speed $\hat{\omega}_r$ and the target speed ω. Although the figure illustrates a q-axis current command value i*q as the current command value, a d-axis current command value i*d as well may be generated unlike in the figure. Meanwhile, the d-axis current command value i*d may be set to 0.

Meanwhile, the current command generator 330 may further include a limiter (not shown) that limits the level so that the current command value i*q is not beyond a permissible range.

Next, the voltage command generator 340 generates d-axis and q-axis voltage command values v*d and v*q based on d-axis and q-axis currents id and iq, obtained by the axis transformation to a two-phase rotating coordinate system by the axis transformer, and the current command values i*d and i*q from the current command generator 330. For example, the voltage command generator 340 may perform PI control by a PI controller 644 and generate the q-axis voltage command value v*q, based on the difference between the q-axis current iq and the q-axis current command value i*q. Moreover, the voltage command generator 340 may perform PI control by a PI controller 648 and generate the d-axis voltage command value v*d, based on the difference between the d-axis current id and the d-axis current command value i*d. Meanwhile, the value of the d-axis current command value i*d may be set to 0, corresponding to the d-axis current id set to 0.

Meanwhile, the voltage command generator 340 may further include a limiter (not shown) that limits the level so that the d-axis and q-axis voltage values v*d and v*q are not beyond permissible ranges.

Meanwhile, the generated d-axis and q-axis voltage command values v*d and v*q are input into the axis transformer 350.

The axis transformer 350 receives the position $\hat{\theta}_r$ calculated by the speed calculator 320 and the d-axis and q-axis voltage command values v*d and v*q and perform axis transformation.

First of all, the axis transformer 350 performs transformation from the two-phase rotating coordinate system to the two-phase stationary coordinate system. In this case, the position $\hat{\theta}_r$ calculated by the speed calculator 320 may be used.

Then, the axis transformer 350 performs transformation from the two-phase stationary coordinate system to a three-phase stationary coordinate system. By this transformation, the axis transformer 1050 outputs three-phase output voltage command values v*a, v*b, and v*c.

The switching control signal output part 360 generates and outputs an pulse width modulation (PWM)-based inverter switching control signal Sic, based on the three-phase output voltage command values v*a, v*b, and v*c.

The output inverter switching control signal Sic may be converted into a gate drive signal by a gate driver (not shown) and input into the gates of the switching elements in the inverter 620. By this, the switching elements Sa, S'a, Sb, S'b, Sc, and S'c in the inverter 620 perform switching operation.

Figure 5A:
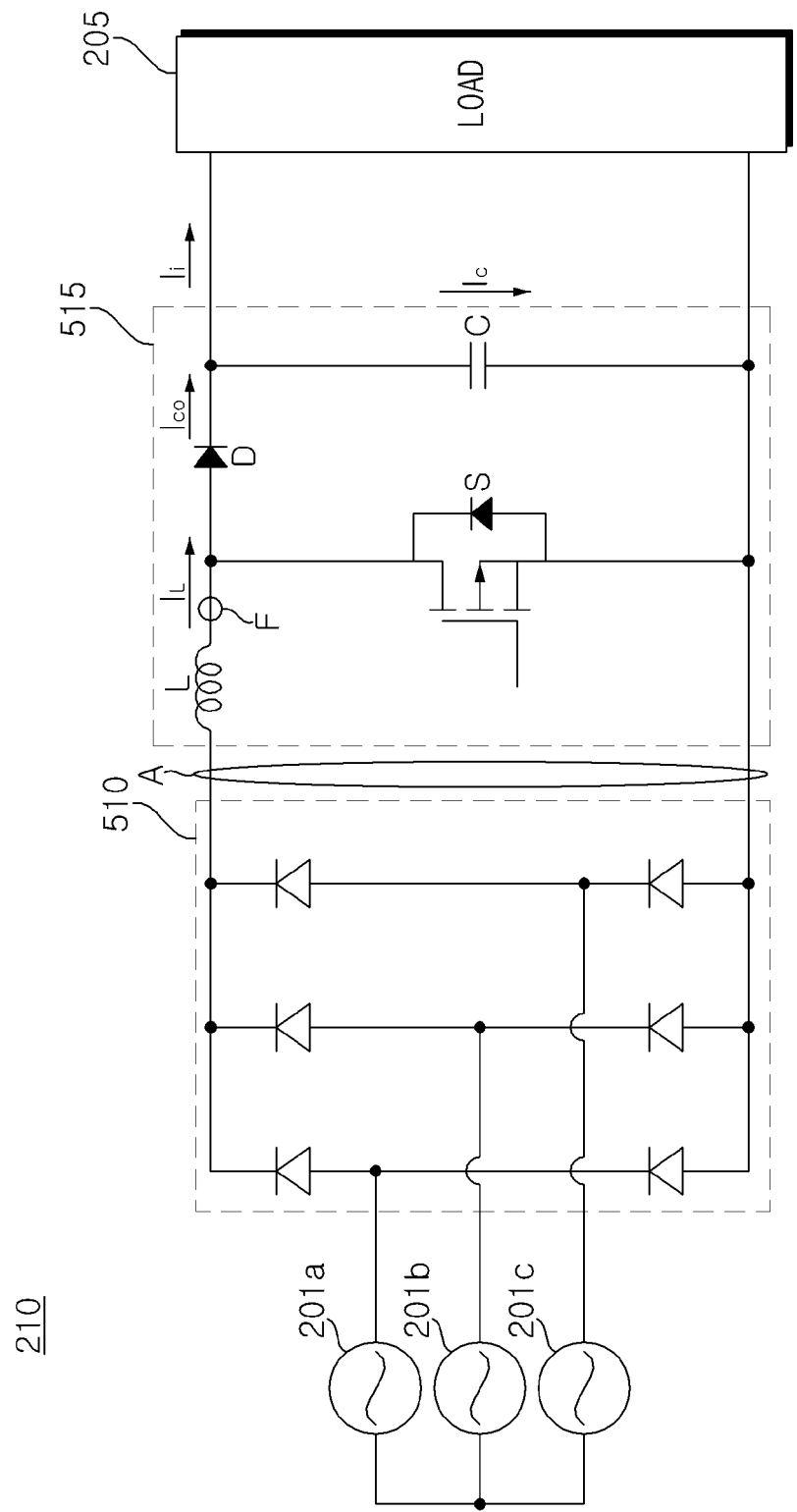
FIG. 5A is an exemplary circuit diagram of the converter of FIG. 3.

FIG. 5A is an exemplary circuit diagram of the converter of FIG. 3.

Referring to the figure, the converter 210 may have a rectification unit 510 that receives and rectifies three-phase alternating current power 210*a*, 201*b*, and 201*c*, and a boot converter 515.

The rectification unit 510 may have a three-phase bridge diode.

The boost converter 515 includes an inductor L, a diode D connected to the inductor L, and a switching element S connected between the inductor L and the diode D.

Meanwhile, an input voltage detection unit A for detecting an input voltage may be disposed between the rectification unit 510 and the boost converter 515, and an inductor current detection unit F for detecting the inductor current flowing in the inductor L may be disposed at the front or back of the inductor L.

Direct current power, obtained by conversion by the converter 210, is output to and stored in the capacitor C connected to the converter output 210.

FIG. 5B is another exemplary circuit diagram of the converter of FIG. 3.

Referring to the figure, the converter 210 may have a rectification unit 510 that receives and rectifies three-phase alternating current power 210*a*, 201*b*, and 201*c*, and an interleaved boot converter 520.

The rectification unit 510 may have a three-phase bridge diode.

The interleaved boost converter 520 may include a first boost converter 523 and a second boost converter 526 that are connected in parallel to each other and perform interleaving operation.

By voltage control using interleaving, voltage control using current distribution is enabled. Accordingly, the durability of circuit elements in the interleave boost converter 520 can be improved. Also, ripple in input current can be reduced.

The first boost converter 523 includes an inductor L1, a diode D1 connected to the inductor L1, and a switching element S1 connected between the inductor L1 and the diode D1.

The second boost converter 526 includes an inductor L2, a diode D2 connected to the inductor L2, and a switching element S2 connected between the inductor L2 and the diode D2.

Meanwhile, an input voltage detection unit A for detecting an input voltage may be disposed between the rectification unit 510 and the boost converter 515, and inductor current detection units F1 and F2 for detecting inductor current may be disposed at the front or back of the inductors L1 and L2, respectively.

Direct current power, obtained by conversion by the converter 210, is output to and stored in the dc-end capacitor C connected to the converter output 210.

Meanwhile, if the input voltage Vs has a ripple component, a harmonic current component induced by the ripple on the input voltage V occurs to the current flowing through the dc-end capacitor C after passing through the rectification unit 510 and boost converter 515 or interleaved boost converter 520 in the converter 210. The present invention proposes a method for reducing such a harmonic current component. This will be described below with reference to FIG. 6 and the subsequent drawings.

Figure 6:
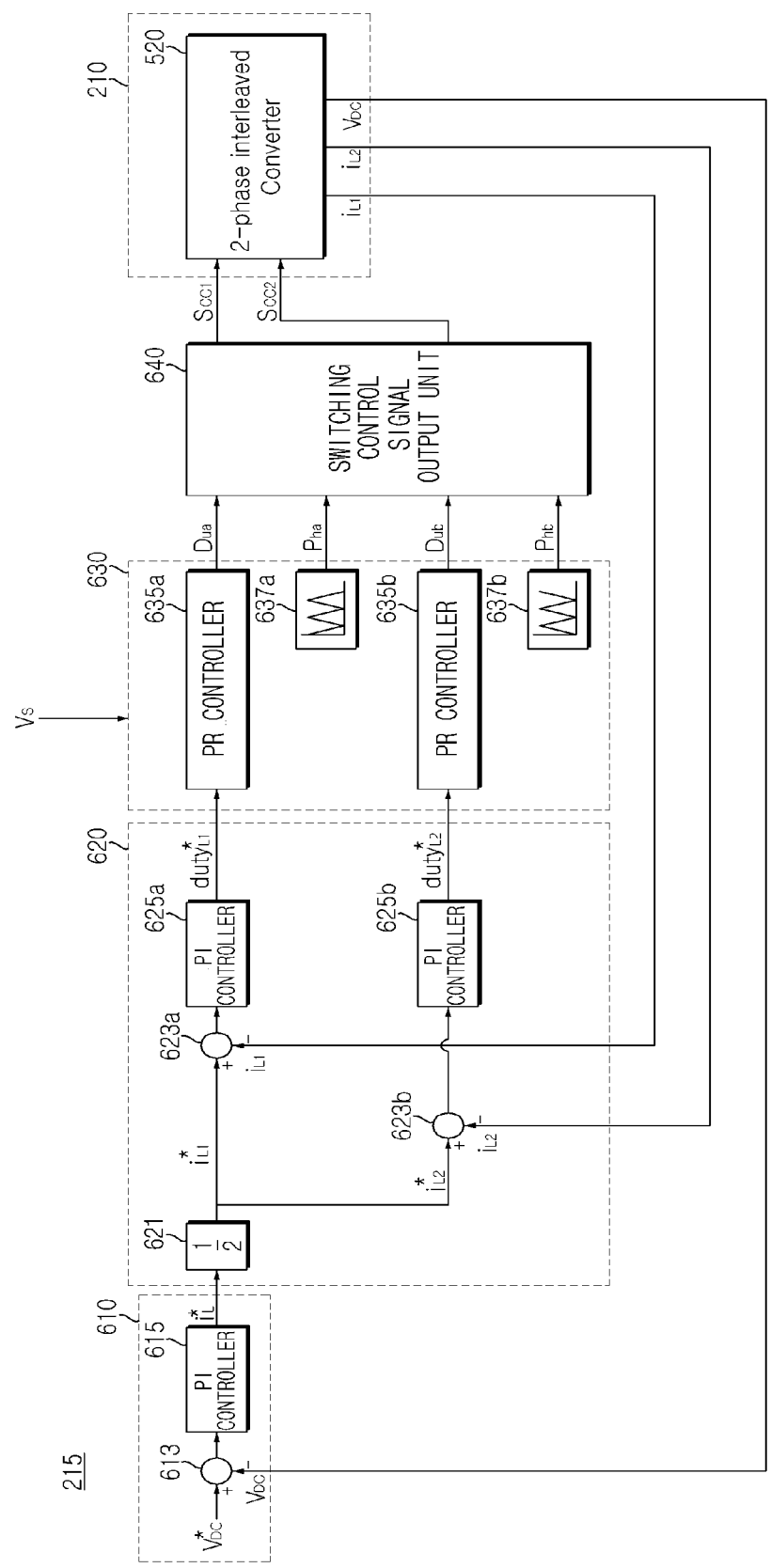
FIG. 6 is an internal block diagram of the converter control unit of FIG. 3.

FIG. 6 is an internal block diagram of the converter control unit of FIG. 3.

Referring to the drawing, the converter control unit 215 may control the converter 210.

In particular, the converter control unit may control the boost converter 515 of FIG. 5A or the interleaved boost converter 520 of FIG. 5B. Hereinafter, a description will be given on the assumption that the converter control unit 215 controls the interleave boost converter 520 of FIG. 5B.

Meanwhile, the converter control unit 215 may include a current command generator 610, a duty command generator 620, a current ripple compensator 630, and a switching control signal output part 640.

The current command generator 610 may include a PI controller 610 that performs PI control based on a dc-end voltage Vdc detected by the dc-end voltage detection unit B and a dc-end voltage command value V*dc, and may generate a current command value i*L by the PI controller 610, etc.

The duty command generator 620 may include a distributor 621 for an interleaved boost converter, and PI controllers 625*a* and 625*b* that perform PI control based on first and second current command values i*L1 and i*L2 distributed by the distributor 621 and inductor currents iL1 and iL2 detected by the inductor current detection units F1 and F2, and may generate first and second duty command values duty*L1 and duty*L2 by the PI controllers 625*a* and 625*b*, etc.

Meanwhile, the current ripple compensator 630 may include proportional resonant controllers 635*a* and 635*b* that perform proportional resonant (PE) control, in order to compensate the generated duty command values duty*L1 and duty*L2.

The proportional resonant controllers 635*a* and 635*b* may output compensated duty command values Dua and Dub through proportional resonant control.

Meanwhile, the current ripple compensator 630 may further include phase-locked loop controllers 637*a* and 637*b* that perform phase locked loop (PLL) control in case of an unbalanced system of input alternating current power Vs.

Particularly, if an unbalanced system is detected by the input voltage detection unit A while the input alternating current Vs is three-phase alternating current power, the phase-locked loop controllers 637*a* and 637*b* may further perform phase-locked loop PLL control. That is, the phases of the compensated duty command values Dua and Dub may be dragged or delayed.

Thus, the phase-locked loop controllers 637*a* and 637*b* may output phase adjustment information Pua and Pub. That is, the current ripple compensator 630 may output the compensated duty command values Dua and Dub and the phase adjustment information Pua and Pub to the switching control signal output part 640.

Meanwhile, unlike in the drawing, the current ripple compensator 630 may output, to the switching control signal output part 640, duty command values Dua and Dub whose phases are compensated by the phase adjustment information Pua and Pub.

Meanwhile, the switching control signal output part 640 may generate and output pulse width modulation (PWM)-based converter switching control signals Scc1 and Scc2 by using either or both of the compensated duty command values Dua and Dub and phase adjustment information Pua and Pub from the current ripple compensator 630.

That is, the switching control signal output part 640 may output a first converter switching control signal Scc1 and a second converter switching control signal Scc2 to the first boost converter 523 and the second boost converter 526, respectively, so as to drive the first boot switching element S1 in the first boost converter 523 and the second boost switching element S2 in the second boost converter 526.

Figure 7:
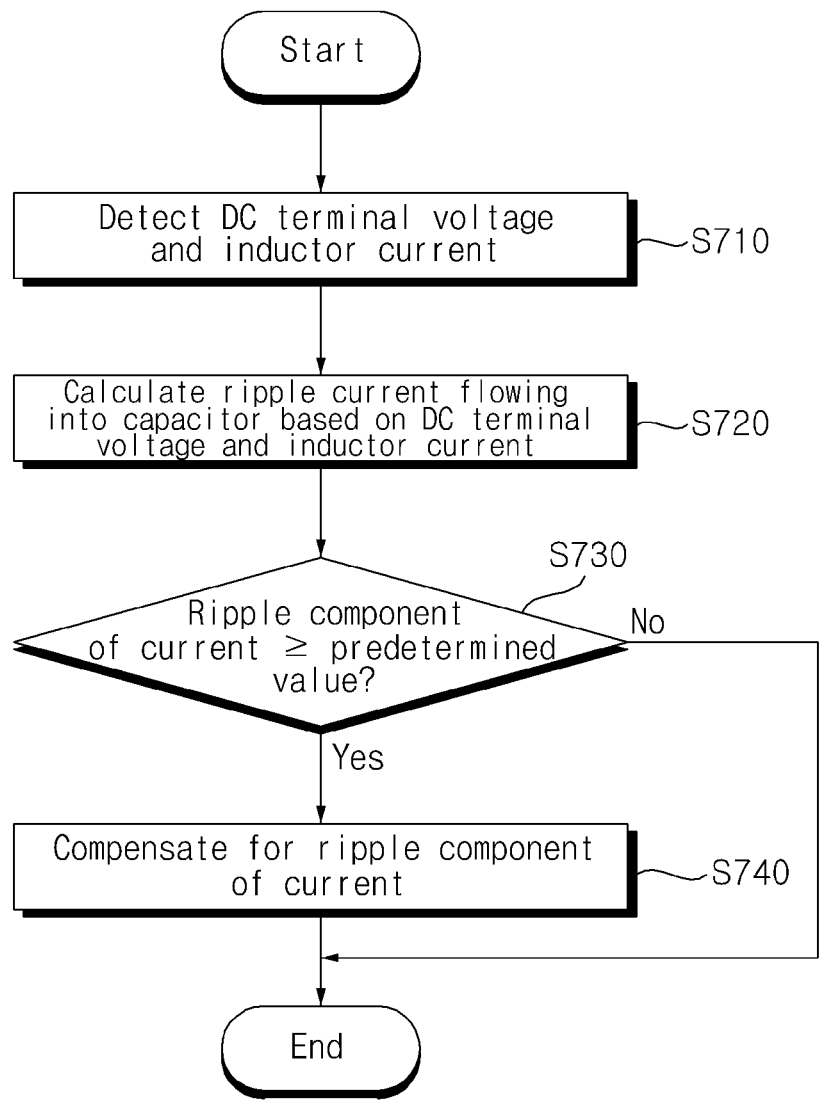
FIG. 7 is a flowchart showing an operation method of a power conversion device according to an exemplary embodiment of the present invention.

FIG. 7 is a flowchart showing an operation method of a power conversion device according to an exemplary embodiment of the present invention. FIGS. 8A to 9B are diagrams to be used a reference to explain the operation method of FIG. 8.

First of all, referring to FIG. 7, the dc-end voltage detection unit B and the inductor current detection unit F or F1 and F2 detect a dc-end voltage Vdc and an inductor current IL or IL1 and IL2 (S710).

Next, the converter control unit 215 calculates the current ripple flowing through the dc-end capacitor C, on the basis of the detected inductor current IL and dc-end voltage Vdc.

On the other hand, in a case where a current detection unit G2 for detecting the current flowing through the capacitor C is provided as shown in FIG. 5*b*, the current ripple flowing through the dc-end capacitor C may be detected by using the current detection unit G2.

Alternatively, in a case where a converter output current detection unit G1 and an inverter input current detection unit G3 are provided as shown in FIG. 5B, the current ripple flowing through the dc-end capacitor C may be calculated on the basis of a converter output current Ico and an inverter input current Ii.

Next, the converter control unit 215 may determine if the current ripple flowing through the dc-end capacitor C is a predetermined value or above (S730), and, if so, may compensate for the current ripple component flowing through the dc-end capacitor C (S740).

As described above, a harmonic current component flowing through the dc-end capacitor C may be induced by a ripple component of an input voltage Vs.

In this regard, the converter control unit 215 may generate and output a converter switching control signal Scc by performing proportional resonant (PE) control for a duty command value of a switching element within the boost converter 210, on the basis of the detected inductor current IL and dc-end voltage Vdc, thereby reducing the current ripple flowing through the c-end capacitor C.

In particular, through proportional resonant control, the converter control unit 215 may compensate a duty command value of a switching element within the boost converter 210 by using a gain for a harmonic component of the input voltage Vs.

Meanwhile, the converter control unit 215 may generate and output a converter switching control signal Scc by performing proportional resonant control and phase-locked loop control for a duty command value of a switching element within the boost converter 210, on the basis of the detected inductor current IL, dc-end voltage Vdc, and input voltage Vs.

Particularly, in case of an unbalanced system of input alternating current power, the converter control unit 215 may further perform phase-locked loop (PLL) control to generate a phase-synchronized converter switching control signal Scc.

While the flowchart of FIG. 7 illustrates that, in the step S730, current ripple compensation control is performed only when the calculated current ripple is a predetermined value or above, this is merely an example and current ripple compensation control may be continuously performed regardless of the value of the calculated current ripple.

Moreover, in order to avoid dc-end current ripple, if a result of calculation within the converter control unit 215 shows that a dc-end current ripple is expected to occur, it is preferable that the above-mentioned proportional resonant control, etc. be performed to reduce the ripple.

Figure 8A:
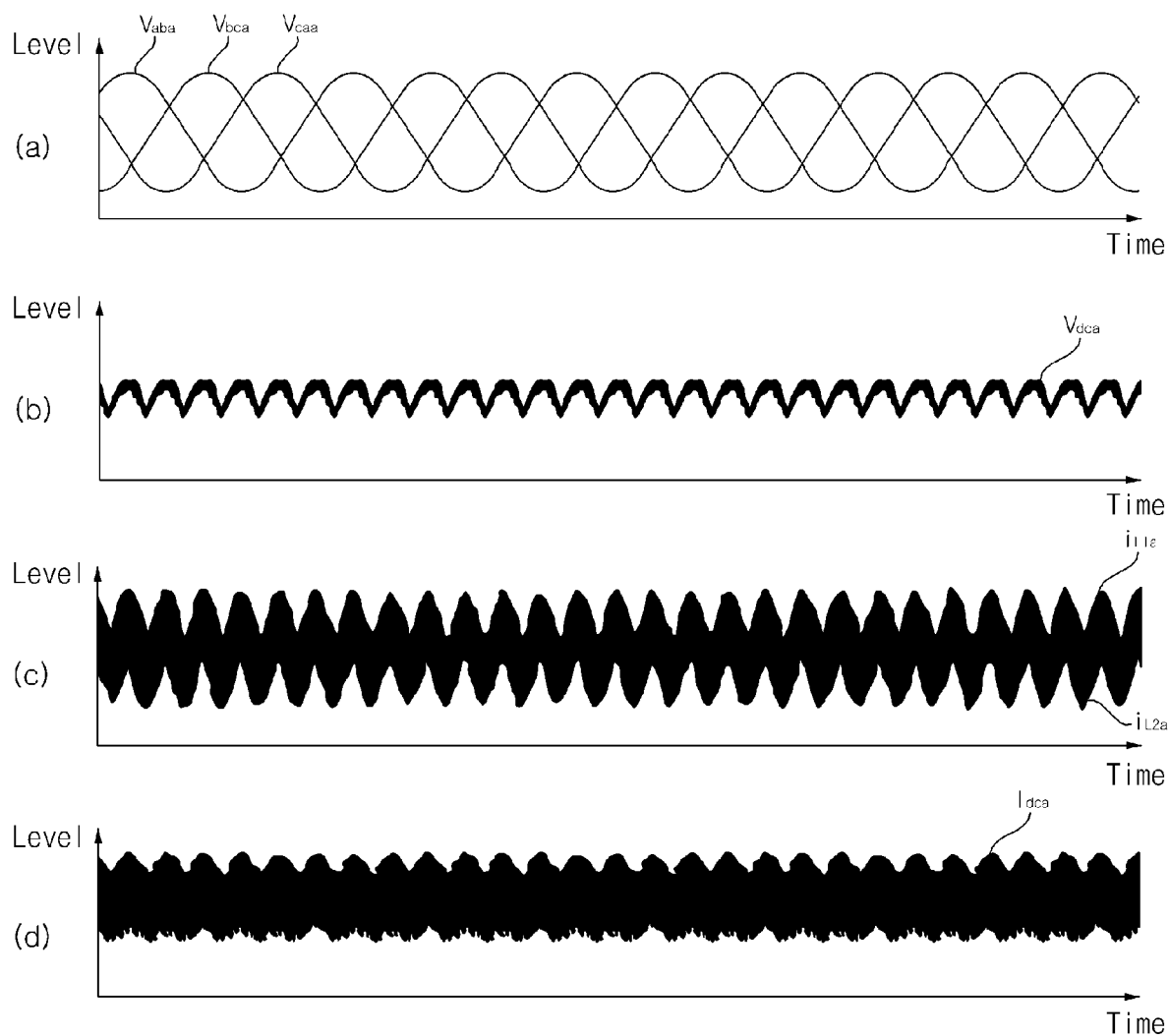
FIGS. 8A to 9B are diagrams to be used a reference to explain the operation method of FIG. 8.
Figure 8B:
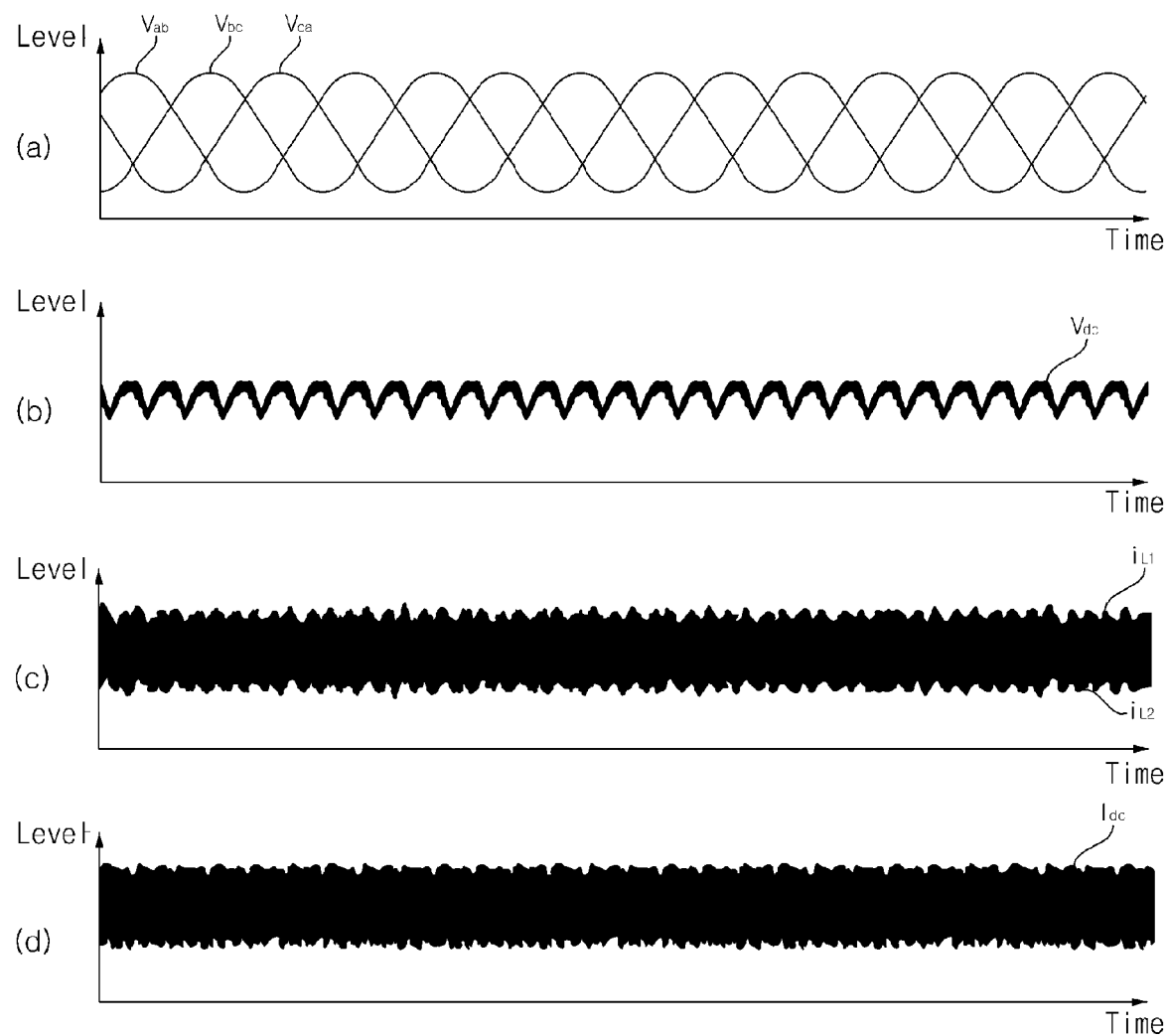

FIGS. 8A to 8B illustrate that only proportional resonant control is performed in case of a system voltage balance.

FIG. 8A is a diagram illustrating waveforms before proportional resonant control in case of a system voltage balance.

(a) of FIG. 8A illustrates three-phase alternating current input voltage waveforms Vab, Vbc, and Vca, (b) of FIG. 8A illustrates an input voltage to the dc-end capacitor C, i.e., a dc-end voltage Vdca, (c) of FIG. 8A illustrates inductor currents IL1a and IL2a, and (d) of FIG. 8A illustrates a current Idca flowing through the dc-end capacitor C.

As shown in the figure, it can be seen that ripple components on the inductor currents IL1a and IL2a affect the current Idca flowing through the dc-end capacitor C.

Meanwhile, as described above, if system voltage has a ripple, the ripple component on the inductor currents IL1a and IL2a and the ripple component on the current Idca flowing through the dc-end capacitor C is much larger.

FIG. 8B is a diagram illustrating waveforms after proportional resonant control in case of a system voltage balance.

(a) of FIG. 8B illustrates three-phase alternating current input voltage waveforms Vab, Vbc, and Vca, (b) of FIG. 8B illustrates an input voltage to the dc-end capacitor C, i.e., a dc-end voltage Vdc, (c) of FIG. 8B illustrates inductor currents IL1 and IL2, and (d) of FIG. 8B illustrates a current Idc flowing through the dc-end capacitor C.

As compared to FIG. 8A, it can be seen that, as a result of proportional resonant control, there is no significant change in dc-end voltage Vdc but the ripple on the inductor currents IL1 and IL2, and the ripple on the current Idc flowing through the dc-end capacitor C are considerably reduced.

Figure 9A:
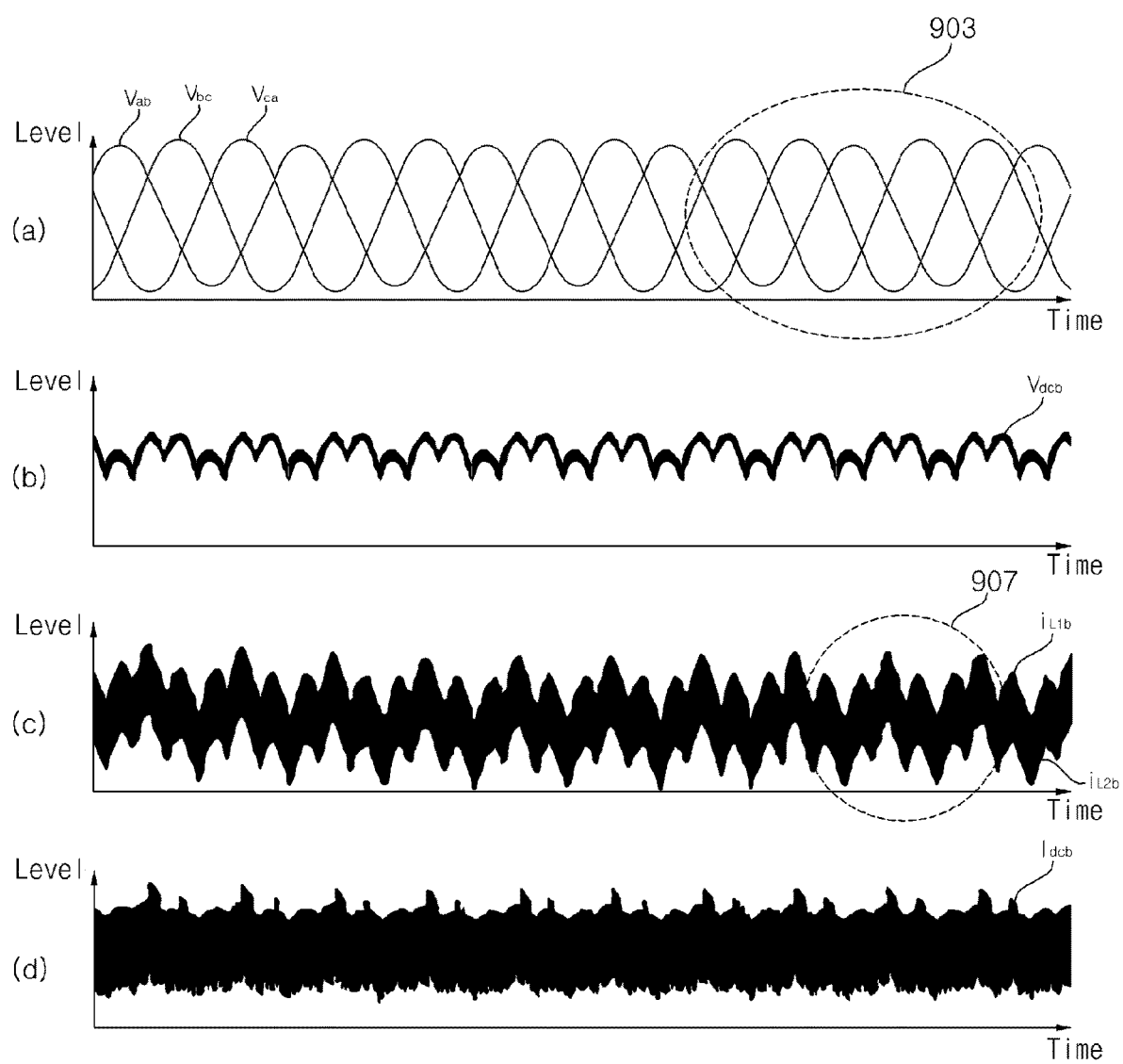
Figure 9B:
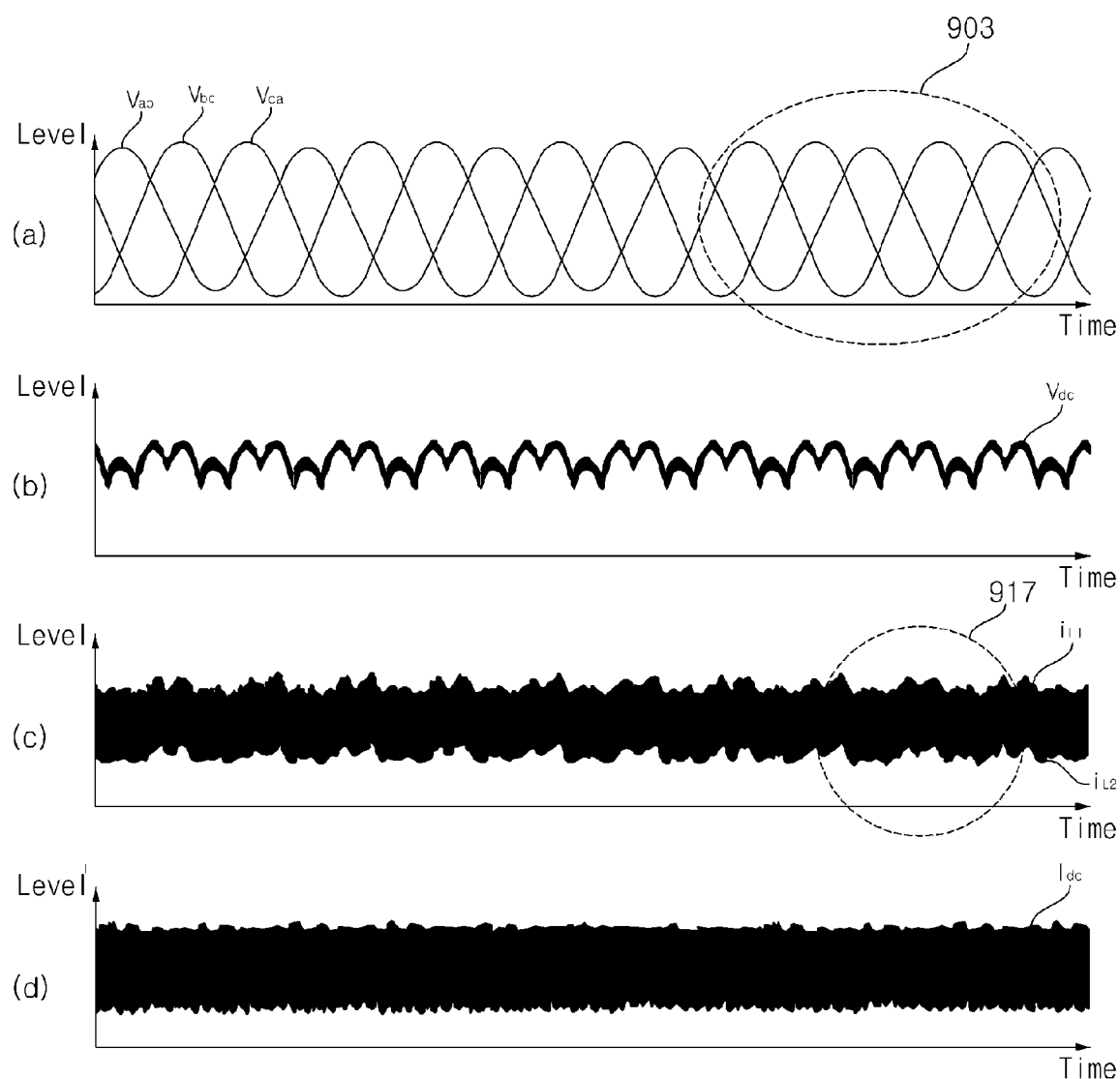

FIGS. 9A and 9B illustrate that only proportional resonant control is performed in case of a system voltage unbalance.

FIG. 9A is a view illustrating waveforms before proportional resonant control and phase-locked loop control in case of a system voltage unbalance.

(a) of FIG. 9A illustrates three-phase alternating current input voltage waveforms Vab, Vbc, and Vca, (b) of FIG. 9A illustrates an input voltage to the dc-end capacitor C, i.e., a dc-end voltage Vdcb, (c) of FIG. 9A illustrates inductor currents IL1b and IL2b, and (d) of FIG. 9A illustrates a current Idcb flowing through the dc-end capacitor C.

As shown in the figure, it can be seen that ripple components on the inductor currents IL1b and IL2b affect the current Idcb flowing through the dc-end capacitor C.

Meanwhile, as described above, if system voltage has a ripple, the ripple component on the inductor currents IL1b and IL2b and the ripple component on the current Idcb flowing through the dc-end capacitor C is much larger.

Meanwhile, if a system voltage unbalance occurs in some area 903 of (a) of FIG. 9A, the ripple on the inductor currents IL1b and IL2b is larger in the region 907, as shown in (c) of FIG. 9A.

FIG. 9B is a view illustrating waveforms after proportional resonant control and phase-locked loop control in case of a system voltage unbalance.

(a) of FIG. 9B illustrates three-phase alternating current input voltage waveforms Vab, Vbc, and Vca, (b) of FIG. 9B illustrates an input voltage to the dc-end capacitor C, i.e., a dc-end voltage Vdc, (c) of FIG. 9B illustrates inductor currents IL1 and IL2, and (d) of FIG. 9B illustrates a current Idc flowing through the dc-end capacitor C.

As compared to FIG. 9A, it can be seen that, as a result of proportional resonant control and phase-locked loop control, there is no significant change in dc-end voltage Vdc but the ripple on the inductor currents IL1 and IL2, and the ripple on the current Idc flowing through the dc-end capacitor C are considerably reduced.

Meanwhile, even if a system voltage unbalance occurs in some area 903 of (a) of FIG. 9A, the ripple on the inductor currents IL1b and IL2b is not larger in the region 917, as shown in (c) of FIG. 9A.

Meanwhile, the power conversion device of the present invention may be applied to various appliances as well as an air conditioner—for example, laundry machines, cooking appliances, refrigerators, TVs, etc. Furthermore, it may be applied to various electronic appliances that employ an interleaved boost converter for varying the direct current power level.

Meanwhile, an operation method of a power conversion device or air conditioner according to the present invention may be implemented in the form of processor-readable program codes in a recording medium that may be read by a processor installed in the air conditioner. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

While the exemplary embodiments of the present invention have been illustrated and described above, the present invention is not limited to the aforementioned specific exemplary embodiments, various modifications may be made by a person with ordinary skill in the art to which the present invention pertains without departing from the subject matters of the present invention that are claimed in the claims, and these modifications should not be appreciated individually from the technical spirit or prospect of the present invention.

The invention claimed is:

1. A power conversion device comprising:
   a rectification unit for rectifying input alternating current power;
   a boost converter for boosting power rectified from the rectification unit and outputting the same;
   a dc-end capacitor connected to an output end of the boost converter;
   an inductor current detection unit for detecting an inductor current flowing in an inductor within the boost converter;
   a dc-end voltage detection unit for detecting voltages of both ends of the dc-end capacitor; and
   a control unit for controlling the boost converter,
   wherein the control unit generates and outputs a converter switching control signal by performing proportional resonant control for a duty command value of a switching element within the boost converter, on the basis of the detected inductor current and dc-end voltage,
   wherein the boost converter comprises an interleaved boost converter,
   wherein the control unit comprises:
      a current command generator to perform PI control based on the dc-end voltage detected by the dc-end voltage detection unit and a dc-end voltage command value, and to output current command value by the PI control;
      a distributor to distribute current command value in consideration of the number of the interleaved boost converter;
      a plurality of duty command generators to perform PI control based on current command value distributed by the distributor and the detected inductor current, and to output duty command value by the PI control, respectively;
      a plurality of proportional resonant controllers to perform proportional resonant (PE) control for the duty command value, and to output a plurality of compensated duty command values by the PE control, respectively;
      a plurality of current ripple compensators to perform phase locked loop (PLL) control for the interleaved boost converter in case of an unbalanced system of the input alternating current power, and to output a plurality of phase adjustment information; and
      a switching control signal output part to generate and output a plurality of converter switching control signals for the interleaved boost converter based on the plurality of compensated duty command values from the plurality of proportional resonant controllers and the plurality of phase adjustment information from the plurality of current ripple compensators.

2. The power conversion device of claim 1, wherein, through the proportional resonant control, the control unit compensates a duty command value of a switching element within the boost converter by using a gain for a harmonic component of the input voltage.

3. The power conversion device of claim 1, further comprising an input voltage detection unit for detecting an input voltage of the input alternating current power,
   wherein the control unit generates and outputs the converter switching control signal by performing proportional resonant control and phase-locked loop control for a duty command value of a switching element within the boost converter, on the basis of the detected input current, dc-end voltage, and input voltage.

4. The power conversion device of claim 1, wherein the control unit generates and outputs the converter switching control signal for compensating for the current ripple flowing through the dc-end capacitor that corresponds to a ripple component of the input voltage, on the basis of the detected inductor current and dc-end voltage.

5. The power conversion device of claim 1, further comprising an input voltage detection unit for detecting an input voltage of the input alternating current power,
   wherein at least one of the current ripple compensators performs phase-locked loop control in case of an unbalanced system of the input alternating current power to further output compensated phase information, and
   the switching control signal output part generates and outputs the converter switching control signal on the basis of the compensated duty command value and the compensated phase information.

6. The power conversion device of claim 1, further comprising:
   an inverter that has a plurality of switching elements and outputs alternating current power to a motor by using the voltage stored in the dc-end capacitor; and
   an inverter control unit that controls the inverter.

7. An air conditioner comprising:
   a compressor that compresses a refrigerant;
   a heat exchanger that transfers heat using the compressed refrigerant; and
   a power conversion device for driving the compressor,
   wherein the power conversion device comprising:
      a rectification unit for rectifying input alternating current power;
      a boost converter for boosting power rectified from the rectification unit and outputting the same;
      a dc-end capacitor connected to an output end of the boost converter;
      an inductor current detection unit for detecting an inductor current flowing in an inductor within the boost converter;
      a dc-end voltage detection unit for detecting voltages of both ends of the dc-end capacitor; and
      a control unit for controlling the boost converter,
      wherein the control unit generates and outputs a converter switching control signal by performing proportional resonant control for a duty command value of a switching element within the boost converter, on the basis of the detected inductor current and dc-end voltage,
      wherein the boost converter comprises an interleaved boost converter,
      wherein the control unit comprises:
         a current command generator to perform PI control based on the dc-end voltage detected by the dc-end voltage detection unit and a dc-end voltage command value, and to output current command value by the PI control;

a distributor to distribute current command value in consideration of the number of the interleaved boost converter;

a plurality of duty command generators to perform PI control based on current command value distributed by the distributor and the detected inductor current, and to output duty command value by the PI control, respectively;

a plurality of proportional resonant controllers to perform proportional resonant (PE) control for the duty command value, and to output a plurality of compensated duty command values by the PE control, respectively;

a plurality of current ripple compensators to perform phase locked loop (PLL) control for the interleaved boost converter in case of an unbalanced system of the input alternating current power, and to output a plurality of phase adjustment information; and a switching control signal output part to generate and output a plurality of converter switching control signals for the interleaved boost converter based on the plurality of compensated duty command values from the plurality of proportional resonant controllers and the plurality of phase adjustment information from the plurality of current ripple compensators.

8. The air conditioner of claim 7, wherein, through the proportional resonant control, the control unit compensates a duty command value of a switching element within the boost converter by using a gain for a harmonic component of the input voltage.

9. The air conditioner of claim 7, further comprising an input voltage detection unit for detecting an input voltage of the input alternating current power, wherein the control unit generates and outputs the converter switching control signal by performing proportional resonant control and phase-locked loop control for a duty command value of a switching element within the boost converter, on the basis of the detected input current, dc-end voltage, and input voltage.

10. The air conditioner of claim 7, wherein the control unit generates and outputs the converter switching control signal for compensating for the current ripple flowing through the dc-end capacitor that corresponds to a ripple component of the input voltage, on the basis of the detected inductor current and dc-end voltage.

11. The air conditioner of claim 7, further comprising an input voltage detection unit for detecting an input voltage of the input alternating current power, wherein at least one of the current ripple compensators performs phase-locked loop control in case of an unbalanced system of the input alternating current power to further output compensated phase information, and the switching control signal output part generates and outputs the converter switching control signal on the basis of the compensated duty command value and the compensated phase information.

12. The air conditioner of claim 7, further comprising:

an inverter that has a plurality of switching elements and outputs alternating current power to a motor by using the voltage stored in the dc-end capacitor; and an inverter control unit that controls the inverter.

* * * * *